(12) United States Patent
Hann et al.

(10) Patent No.: US 8,279,859 B2
(45) Date of Patent: Oct. 2, 2012

(54) METHOD AND ARRANGEMENT FOR TRANSFERRING SYNCHRONIZING INFORMATION

(75) Inventors: Kenneth Hann, Espoo (FI); Heikki Laamanen, Espoo (FI); Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 85 days.

(21) Appl. No.: 12/128,008

(22) Filed: May 28, 2008

(65) Prior Publication Data

US 2008/0298525 A1 Dec. 4, 2008

(30) Foreign Application Priority Data

May 28, 2007 (FI) ...................................... 20070417

(51) Int. Cl.
*H04L 12/66* (2006.01)

(52) U.S. Cl. ....................................................... 370/356

(58) Field of Classification Search .................. 370/201, 370/208, 203, 216–228, 254–258, 298–306, 370/395.1, 395.2, 395.4, 395.5, 395.62, 400–411, 370/431–449, 458, 464–500, 503–536
See application file for complete search history.

(56) References Cited

U.S. PATENT DOCUMENTS

| | | | |
|---|---|---|---|
| 5,828,696 A | | 10/1998 | Gelblum et al. |
| 5,889,856 A | * | 3/1999 | O'Toole et al. .......... 379/399.02 |
| 6,072,782 A | * | 6/2000 | Wu ................. 370/286 |
| 6,088,358 A | * | 7/2000 | Tomita et al. ............. 370/395.2 |
| 6,263,048 B1 | * | 7/2001 | Nelson et al. ............. 379/27.03 |
| 6,519,291 B1 | * | 2/2003 | Dagdeviren et al. ......... 375/260 |
| 6,577,598 B1 | * | 6/2003 | Hwang et al. ................ 370/235 |
| 6,778,595 B1 | * | 8/2004 | Arai et al. ..................... 375/222 |
| 6,847,693 B1 | * | 1/2005 | Strait ............................ 375/355 |
| 7,050,521 B1 | * | 5/2006 | Alavi .............................. 375/362 |
| 7,076,002 B1 | * | 7/2006 | Ramirez-Mireles et al. . 375/316 |
| 7,533,403 B1 | * | 5/2009 | Krein et al. ..................... 725/74 |
| 2003/0012352 A1 | * | 1/2003 | Kiykioglu et al. ........ 379/114.01 |
| 2003/0031196 A1 | * | 2/2003 | Nishimura ..................... 370/441 |
| 2003/0086487 A1 | * | 5/2003 | Kumar ........................... 375/222 |
| 2003/0219076 A1 | * | 11/2003 | Jeong et al. .................... 375/260 |

(Continued)

FOREIGN PATENT DOCUMENTS

CN 1933522 3/2007

(Continued)

OTHER PUBLICATIONS

Search Report.

(Continued)

*Primary Examiner* — Kwang B Yao
*Assistant Examiner* — Jung-Jen Liu
(74) *Attorney, Agent, or Firm* — Young & Thompson

(57) ABSTRACT

A method and arrangement for transferring synchronizing information in a data transmission system includes modem connections. The arrangement includes a modulator (207) arranged to generate an analog signal (222) modulated by synchronizing information, the frequency spectrum of the signal being located in a frequency range that falls outside the data transmission bands of the modem line connected to the network element. The arrangement includes a switching circuit (208) arranged to connect the analog signal to a data transmission cable (206) that forms part of the modem line connected to a network element. The arrangement includes a second switching circuit (209) arranged to receive the analog signal from a data transmission cable that forms part of the modem line connected to the second network element. The arrangement also includes a regenerator (209-arranged to regenerate the synchronizing information from the analog signal.

22 Claims, 7 Drawing Sheets

U.S. PATENT DOCUMENTS

| | | | |
|---|---|---|---|
| 2005/0036540 A1* | 2/2005 | Noma et al. | 375/222 |
| 2005/0157779 A1* | 7/2005 | Hasegawa et al. | 375/219 |
| 2005/0237954 A1* | 10/2005 | Hasegawa et al. | 370/292 |
| 2006/0098804 A1* | 5/2006 | Larzabal et al. | 379/346 |
| 2006/0133351 A1* | 6/2006 | Adolfsson | 370/352 |
| 2006/0159162 A1* | 7/2006 | Shrikhande et al. | 375/222 |
| 2007/0030889 A1* | 2/2007 | Yu | 375/222 |
| 2009/0262647 A1* | 10/2009 | Pickering et al. | 370/241 |

FOREIGN PATENT DOCUMENTS

| | | |
|---|---|---|
| JP | 59008454 | 1/1984 |
| JP | 63153934 | 6/1988 |

OTHER PUBLICATIONS

CN Office Action dated Feb. 22, 2012 from CN200810109320.5.

* cited by examiner

METHOD AND ARRANGEMENT FOR TRANSFERRING SYNCHRONIZING INFORMATION

FIELD OF THE INVENTION

The invention relates to a method and arrangement for transferring synchronizing information in a data transmission system including modem connections.

BACKGROUND

In many data transmission networks, there is a need to synchronize the clock signals of the network elements, so that the ratio of the clock signal frequencies of two or more separate network elements is constant, as accurately as possible. Often the momentary phases of clock signals of separate network elements are attempted to be kept mutually locked as accurately as possible. Said network elements can be for instance routers or base stations in a mobile phone network. FIG. 1 illustrates an example of a data transmission system with a need to mutually synchronize the clock signals of the base stations 101 and 102 of a mobile phone network. The base station 101 is connected to the network element 110 by a modem line 103, and the base station 102 is connected to the network element 110 by a modem line 104. Said modem lines can be for example ADSL (Asymmetric Digital Subscriber Line) or VDSL (Very high speed Digital Subscriber Line) lines. The modem line 103 includes modems 111 and 112 as well as a connecting data transmission cable 113 therebetween. Respectively the modem line 104 includes modems 114 and 115 as well as a connecting data transmission cable 116 therebetween. The modem line can also comprise two or several successive modem links, each of which is provided with a data transmission cable, a modem being arranged at both ends of the cable. The network element 110 is arranged to connect the modems 112 and 115 to a data network 120. The network element 110 and the modems 112 and 115 are often integrated as one DSLAM device (Digital Subscriber Line Access Multiplexer). The data network 120 can be for example the Internet.

In a prior art arrangement, the mutual synchronizing of the clock signals of the base stations 101 and 102 is based on synchronizing messages that are transmitted via modem lines 103 and 104 to the base stations 101 and 102, and on the basis of which each base station adjusts the operation frequency and/or operation phase of its own clockwork. A remarkable random-type share is often found in the transit delay of the synchronizing messages, and this random-type share complicates the adjusting process based on synchronizing messages and weakens the quality of the mutual synchronizing of the clock signals. Said random-type share results, among others, from random-type queuing delays experienced by the data to be transferred in the transmission and/or reception buffers of the network element 110 and of the modems 111, 112, 114 and 115. The random-type nature of the transit delay is strong particularly in packet, frame and cell switched data transmission.

The publications EP 1455473 A2 and WO 2005/020486 A1 suggest an arrangement where the clock signal are adjusted on the basis of the information represented only by those synchronizing messages that have experienced the shortest detected transit delay. Each synchronizing message that has experienced the shortest detected transit delay is selected during an observation period of a predetermined length from among the group of synchronizing messages. When the data network is lightly burdened, the synchronizing messages that have experienced the shortest detected transit delay have not needed to remarkably queue in the transmission buffers and/or reception buffers of network elements. In other words, said transmission buffers and/or reception buffers have been empty or nearly empty, when the synchronizing messages that have experienced the shortest detected transit delay have arrived in said buffers. Consequently, the arrangement can be used for reducing the effect of random-type queuing delays on the adjustment of the clock signal. The heavier the data network is burdened, the rarer are situations where the transmission buffers and/or reception buffers of the network element are empty or nearly empty. When the burdening of the data network increases, the shortest synchronizing message transit delay that occurs during an observation period with a fixed duration all the more rarely represents a transit delay that does not contain random-type queuing delay. The random-type share of the transit delay complicates the operation of adjustments based on synchronizing messages and deteriorates the quality of the mutual synchronizing of the clock signals. The random-type share of the shortest transit delay occurring during an observation period can be cut by extending the duration of the observation period. On the other hand, any lengthening of the observation period also extends the interval between successive adjusting operations, which complicates the operation of adjustments based on synchronizing messages and deteriorates the quality of the mutual synchronizing of the clock signals.

The publication WO 2005/077063 A2 suggests an arrangement where the adjusting effect of the information represented by a synchronizing message is attempted to be weighted according to how near the transit delay experienced by said synchronizing message is to the transit delay average, type value, median value or low-pass filtered value. Consequently, this solution reduces the effect of the extreme ends of the transit delay distribution on the clock signal adjustment. In certain situations, the method according to this arrangement results in an improved quality in the mutual synchronizing of clock signals, as compared to the conventional method based on averaging or low-pass filtering. The challenge in the practical implementation is the effect of the low-frequency components of the transit delays on the transit delay average, type value, median value and low-pass filtered value.

In another prior art arrangement, the mutual synchronizing of the clock signals of the base stations 101 and 102 is based on satellite transmitted messages that are received in the base stations 101 and 102, and on the basis of which each base station adjusts the operation frequency and/or operation phase of its own clockwork. Said satellite can belong for example to the US GPS system (Global Positioning System), to the European Galileo system or to the Russian GLONASS system. This kind of solution requires that there are provided receiver systems in connection with the base stations 101 and 102 for receiving synchronizing messages. Said receiver systems can take up a remarkable share of the price of the base stations. In addition, disturbance signals can for political reasons be added in the satellite transmitted messages, which often weakens the accuracy of the synchronizing quality.

SUMMARY

The present invention relates to an arrangement for transferring synchronizing information in a data transmission system containing modem lines. The arrangement according to the invention comprises:

a modulator that is arranged to generate an analog signal modulated by said synchronizing information, the frequency spectrum of said signal being located in a frequency range that falls outside the data transmission bands of the modem line connected to the first network element of said data transmission system, a first switching circuit that is arranged to connect said analog signal to a data transmission cable that forms part of the modem line connected to said first network element, a regenerator that is arranged to regenerate said synchronizing information from said analog signal, and a second switching circuit that is arranged to connect said analog signal to said regenerator from a data transmission cable that forms part of the modem line connected to the second network element of said data transmission system.

The invention also relates to a method for transferring synchronizing information in a data transmission system containing modem lines. In the method according to the invention:

there is generated an analog signal modulated by said synchronizing information, the frequency spectrum of said analog signal being located in a frequency range that falls outside the data transmission bands of the modem line connected to the first network element of said data transmission system, said analog signal is connected to a data transmission cable that forms part of the modem line connected to said first network element, said analog signal is received from the data transmission cable that forms part of the modem line connected to the second network element of said data transmission system, and said synchronizing information is regenerated from said analog signal.

By means of the different embodiments of the invention, there is achieved an advantage with respect to the prior art arrangements described in this document, i.e. the advantage that the transfer of the synchronizing information is not subjected to the effects of the fluctuation of the transit delay of the data to be transmitted through the modem lines and that, on the other hand, there is no need to receive satellite transmitted signals.

The various different embodiments of the invention are characterized by what is set forth in the dependent claims.

BRIEF DESCRIPTION OF THE DRAWINGS

In the following description, the various embodiments of the invention and their advantages are explained in more detail with reference to the described exemplary embodiments and the appended drawings, where.

DESCRIPTION OF EMBODIMENTS

Figure 1:
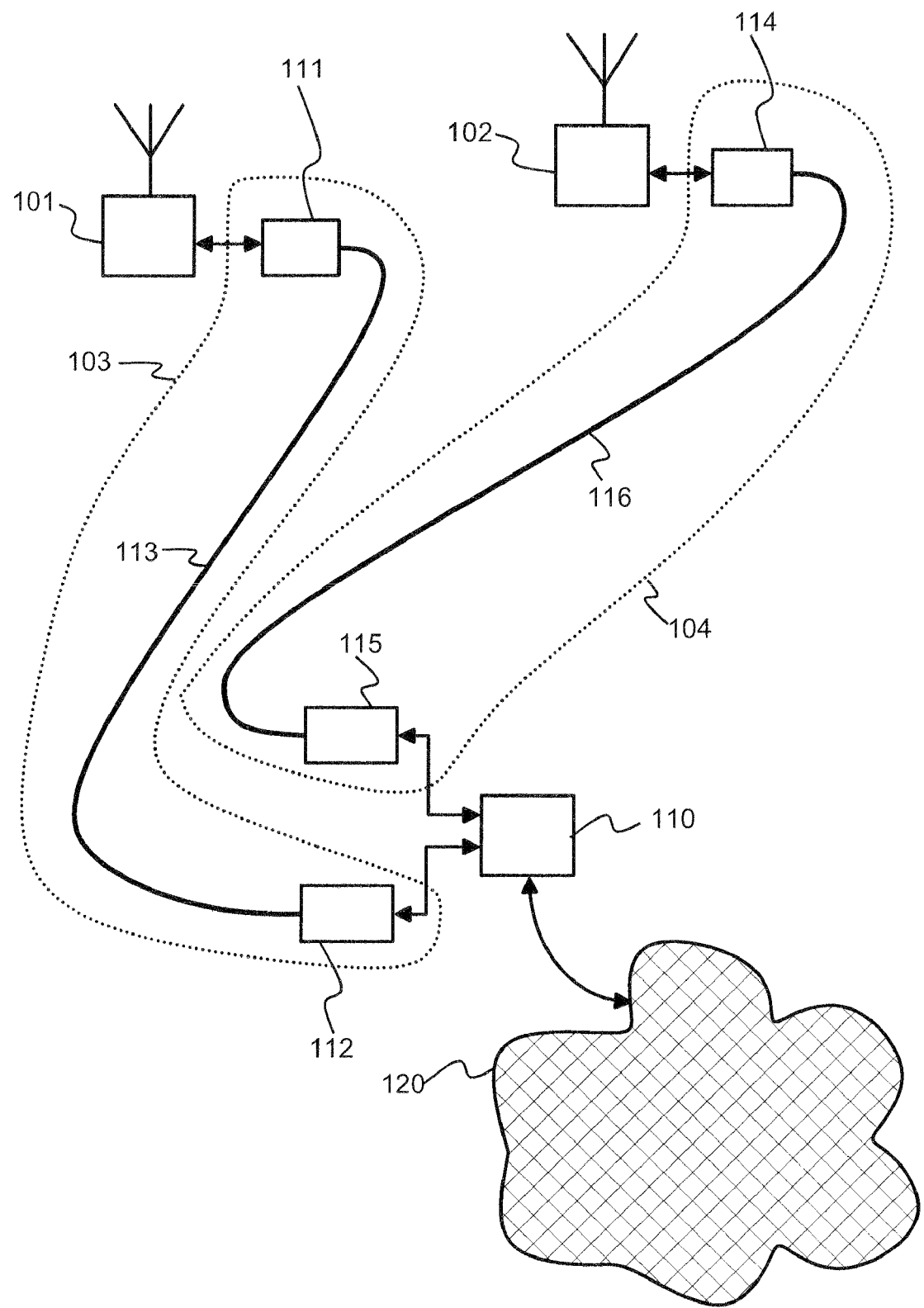
FIG. 1 illustrates an example of a data transmission system with a need to mutually synchronize the clock signals of different network elements.

FIG. 1 was explained above, in connection with the description of the prior art.

Figure 2:
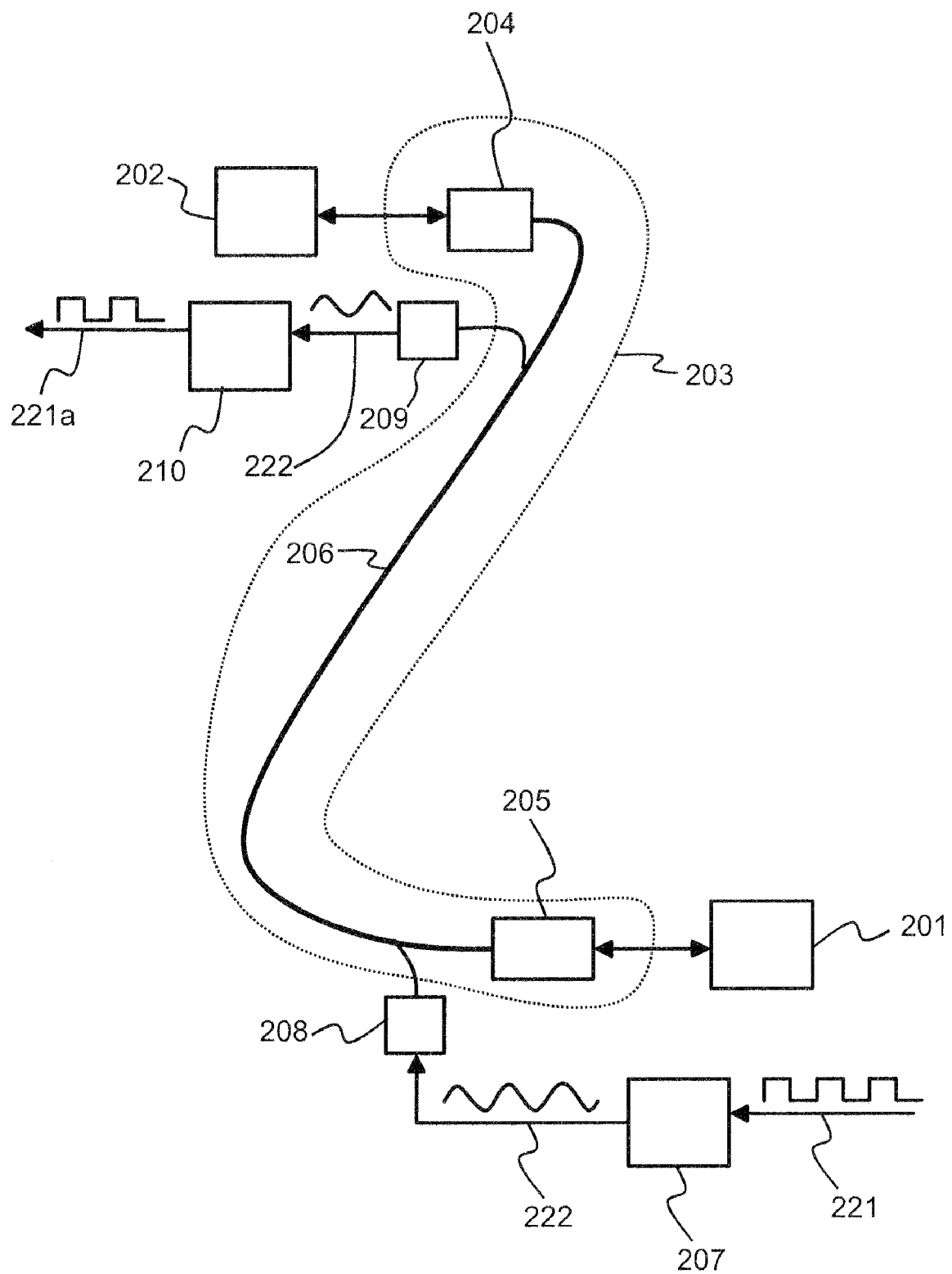
FIG. 2 illustrates an example of a data transmission system provided with an arrangement according to an embodiment of the invention for transferring synchronizing information.

FIG. 2 illustrates an example of a data transmission system, provided with an arrangement according to an embodiment of the invention for transferring synchronizing information. The data transmission system includes a first network element 201, a second network element 202 and a modem line 203 that is arranged to establish a two-way data transmission connection between the network elements 201 and 202. The modem line 203 comprises modems 204 and 205 and a data transmission cable 206 that can be for example a twisted twin wire or a coaxial cable. The arrangement for transferring synchronizing information includes a modulator 207 that is arranged to generate an analog signal 222 modulated by synchronizing information, the frequency spectrum of said signal being located in a frequency range that falls outside the data transmission bands of the modem line 203. The signal 221 connected to the input of the modulator 207 represents said synchronizing information. The signal 221 can be for example a digital clock signal that fluctuates cyclically between two values. The arrangement for transferring synchronizing information includes a first switching circuit 208 that is arranged to connect said analog signal 222 to a data transmission cable 206 at the end located on the side of the network element 201, and a second switching circuit 209 that is arranged to receive said analog signal 222 from the data transmission cable 206 at the end located on the side of the network element 202. The arrangement for transferring synchronizing information includes a regenerator 210 that is arranged to regenerate said synchronizing information from the analog signal 222. The output signal 221a of the regenerator 210 represents said synchronizing information. The output signal 221a can be for example a digital clock signal that fluctuates cyclically between two values.

In an arrangement according to an embodiment of the invention, the analog signal 222 is a cyclic signal, the cycle of which has a predetermined curve shape, and the cycle length of which is determined on the basis of the cycle length of the clock signal 221 representing said synchronizing information. Said predetermined curve shape can be for instance sinusoidal, or a sum of several sinusoidal components with varying frequencies. The modulator 207 can include for example a digital to analog converter that is arranged to convert the signal 221 to analog form, and a phase-locked loop, the input signal of which is the output signal of said digital to analog converter. The regenerator 210 can include for instance a phase-locked loop, the input signal of which is the analog signal 222, and the output signal of which becomes the signal 221a representing the synchronizing information. In an arrangement according to an alternative embodiment of the invention, the analog signal 222 is a pseudorandom signal that is established by a predetermined algorithm.

In an arrangement according to an embodiment of the invention, the modulator 207 is arranged to place the frequency spectrum of the analog signal 222 in a frequency range located below the data transmission bands of the modem line 203. Now the modem line 203 can be for example ADSL (Asymmetric Digital Subscriber Line) or VDSL (Very high speed Digital Subscriber Line).

In an arrangement according to an embodiment of the invention, the modulator 207 is arranged to adjust the frequency spectrum of the analog signal 222 in a frequency range that is located above the data transmission bands of the modem line 203. Now the modem line 203 can be for instance SDSL (Symmetric Digital Subscriber Line) or HDSL (High speed Digital Subscriber Line). The HDSL and SDSL modem lines apply baseband modulation, the data transmission band of which essentially begins with zero frequency.

In the simplest form, the switching circuit 208 comprises electric wires that are arranged to establish galvanic contacts between the output terminal of the modulator 207 and the electric wires of the data transmission cable 206. Respectively, in the simplest form the switching circuit 209 comprises electric wires that are arranged to establish galvanic contacts between the input terminal of the regenerator 210 and the electric wires of the data transmission cable 206. Now the regenerator 210 must be constructed so that its operation is not disturbed, even if its input signal also contains signal components representing the data transmission of the modem line 203. In an arrangement according to an embodiment of the invention, the switching circuit 209 comprises a filter, the stopband of which covers the frequency range of the data transmission bands of the modem line 203.

Figure 3:
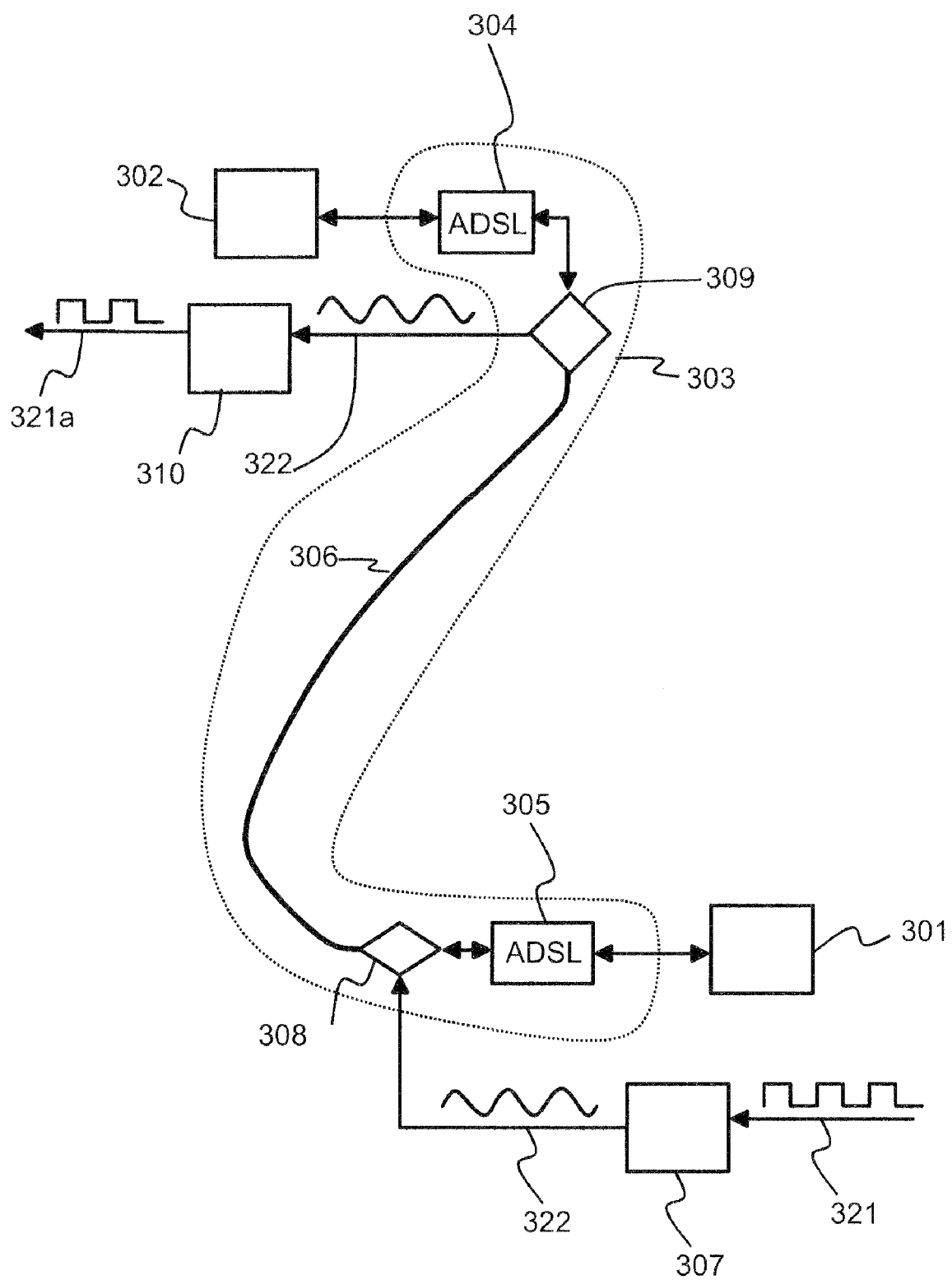
FIG. 3 illustrates an example of a data transmission system provided with an arrangement according to an embodiment of the invention for transferring synchronizing information.

FIG. 3 illustrates an example of a data transmission system provided with an arrangement according to an embodiment of the invention for transferring synchronizing information. The data transmission system includes a first network element 301, a second network element 302 and an ADSL modem line 303 (Asymmetric Digital Subscriber Line) that is arranged to establish a two-way data connection between the network elements 301 and 302. The ADSL 303 includes ADSL modems 304 and 305, a data transmission cable 306 and POTS splitters (Plain Old Telephone Service) 308 and 309. The arrangement for transferring synchronizing information includes a modulator 307 that is arranged to generate an analog signal 322 modulated by synchronizing information, the frequency spectrum of said signal being located in the telephone traffic audibility range (300 Hz-3400 Hz). A signal 321 connected to the input of the modulator 307 represents said synchronizing information. The low-pass branch of the POTS splitter 308 is arranged to connect said analog signal 322 to the data transmission cable 306, and the low-pass branch of the POTS splitter 309 is arranged to receive said analog signal 322 from the data transmission cable 306. The arrangement for transferring synchronizing information includes a regenerator 310 that is arranged to regenerate said synchronizing information from the analog signal 322. The regenerator output signal 321a represents said synchronizing information.

Figure 4:
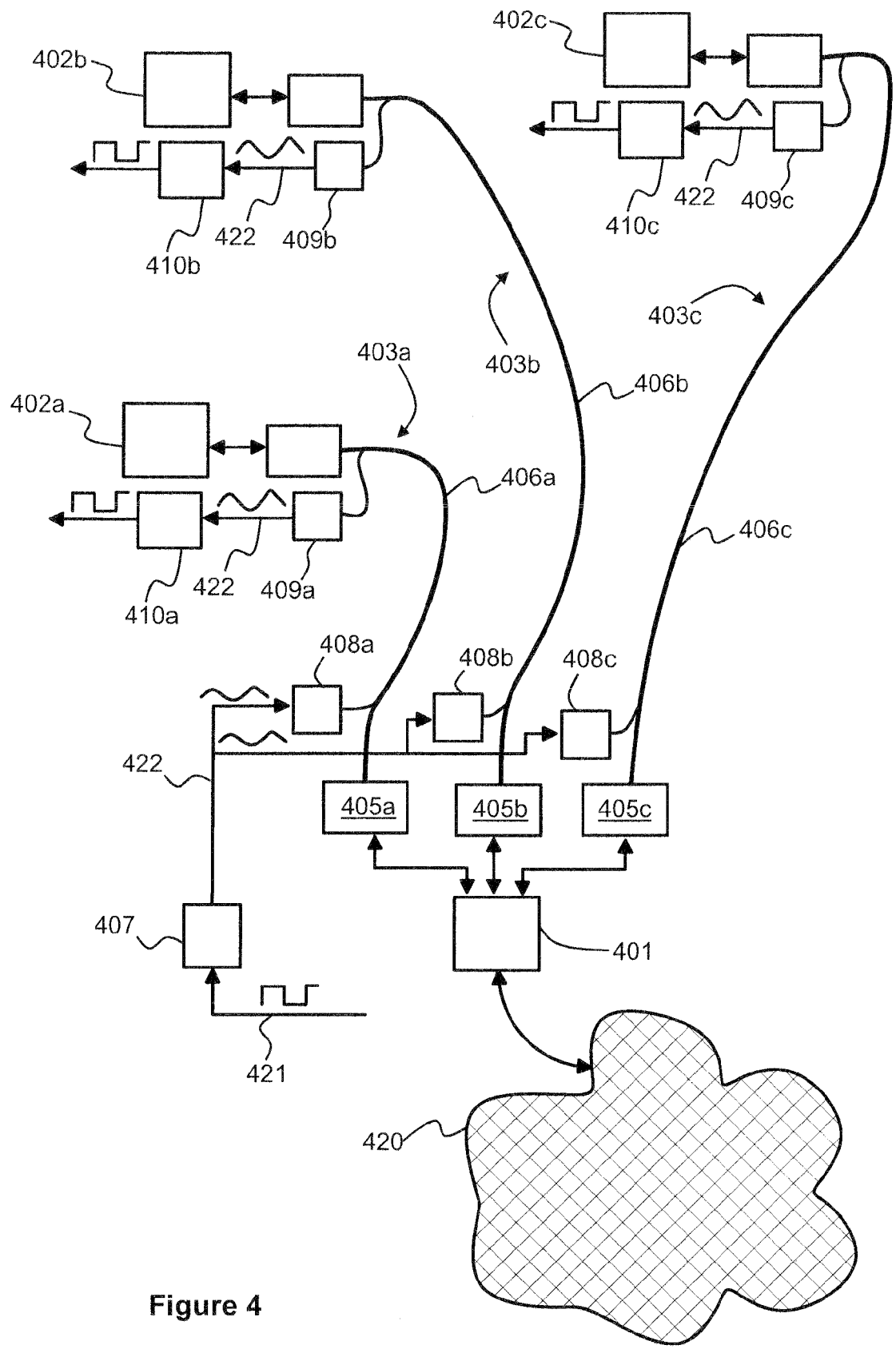
FIG. 4 illustrates an example of a data transmission system provided with an arrangement according to an embodiment of the invention for transferring synchronizing information.

FIG. 4 illustrates an example of a data transmission system provided with an arrangement according to an embodiment of the invention for transferring synchronizing information. The data transmission system includes network elements 401, 402a, 402b and 402c and modem lines 403a, 403b and 403c, which constitute the data transmission connections between the network element 401 and each of the network elements 402a, 402b and 402c. The network element 401 is arranged to connect the modems 405a, 405b and 405c to the data network 420, which can be for example the Internet. The network elements 402a, 402b and 402c can be for instance base stations of a mobile phone network. Synchronizing information is transferred from the location of the network element 401 to the locations of the network elements 402a, 402b and 402c. The arrangement for transferring synchronizing information includes a modulator 407 that is arranged to generate an analog signal 422 modulated by synchronizing information, the frequency spectrum of said signal being located in a frequency range that falls outside the data transmission bands of the modem lines 403a, 403b and 403c. The signal 421 connected to the input of the modulator 407 represents said synchronizing information. In connection with the network element 401, there are provided switching circuits 408a, 408b and 408c that are arranged to connect said analog signal 422 to the data transmission cables 406a, 406b and 406c of the modem lines 403a, 403b and 403c. In connection with the network element 402a, there is provided a switching circuit 409a that is arranged to receive said analog signal 422 from the data transmission cable 406a, and a regenerator 410a that is arranged to regenerate said synchronizing information from the analog signal 422. In connection with the network element 402b, there is provided a switching circuit 409b that is arranged to receive said analog signal 422 from the data transmission cable 406b, and a regenerator 410b that is arranged to regenerate said synchronizing information from the analog signal 422. In connection with the network element 402c, there is provided a switching circuit 409c that is arranged to receive said analog signal 422 from the data transmission cable 406c, and a regenerator 410c that is arranged to regenerate said synchronizing information from the analog signal 422.

Figure 5:
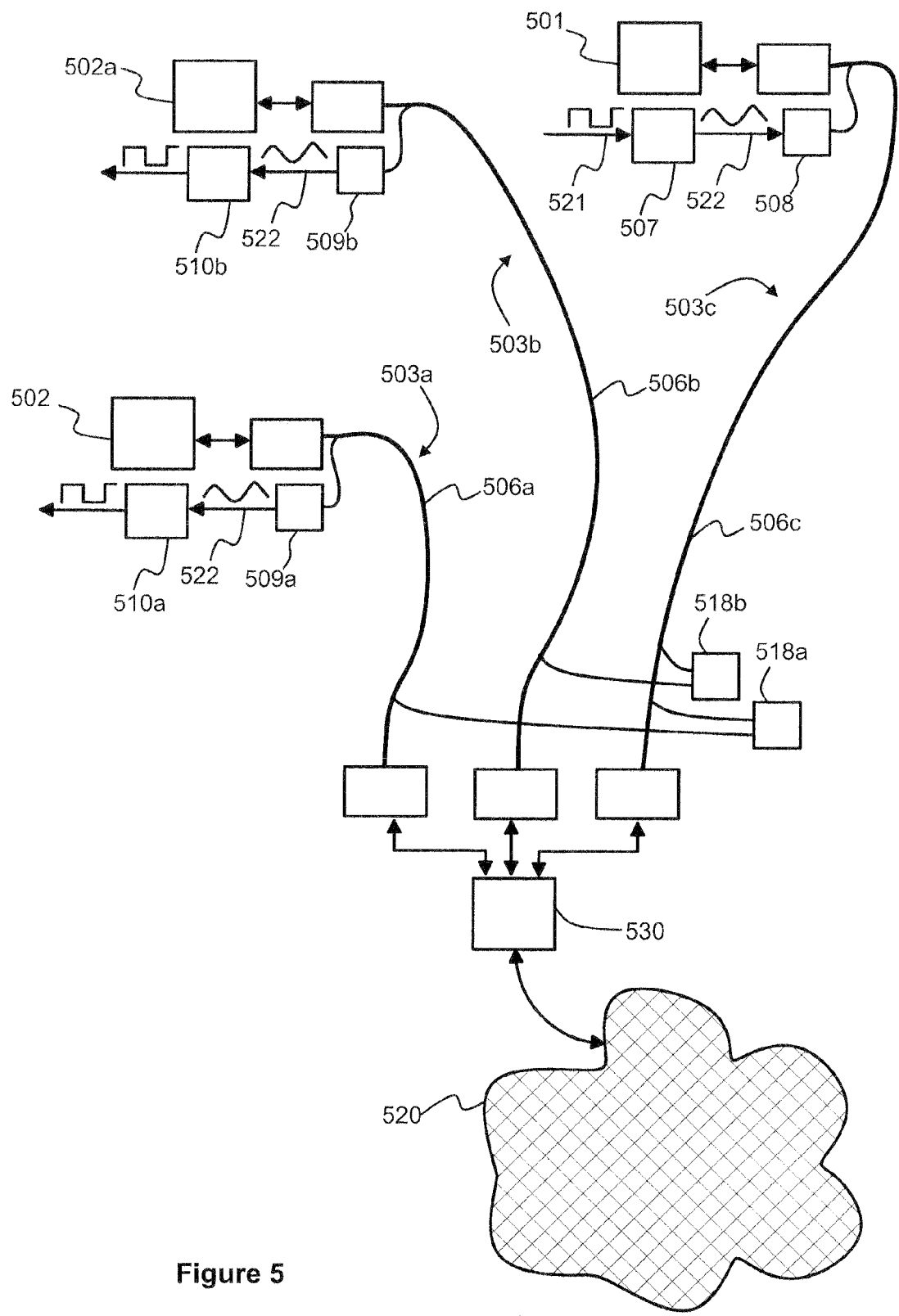
FIG. 5 illustrates an example of a data transmission system provided with an arrangement according to an embodiment of the invention for transferring synchronizing information.

FIG. 5 illustrates an example of a data transmission system, provided with an arrangement according to an embodiment of the invention for transferring synchronizing information. The data transmission system includes a first network element 501, a second network element 502, a third network element 530 and a fourth network element 502a. The transmission system includes modem lines 503a, 503b and 503c that establish data transmission connections between the network element 530 and each of the network elements 501, 502 and 502a. The network element 530 is connected to a data network 520, which can be for example the Internet. Synchronizing information is transferred from the location of the network element 501 to the locations of the network elements 502 and 502a. In connection with the network element 501, there is provided a modulator 507 that is arranged to generate an analog signal 522 modulated by synchronizing information, the frequency spectrum of said signal being located in a frequency range that falls outside the data transmission bands of the modem line 503c. The signal 521 connected to the input of the modulator 507 represents said synchronizing information. In connection with the network element 501, there is provided a first switching circuit 508 that is arranged to connect said analog signal 522 to the data transmission cable 506c of the modem line 503c. In connection with the network element 502, there is provided a second switching circuit 509a that is arranged to receive said analog signal 522 from the data transmission cable 506a of the modem line 503a. In connection with the network element 530, there is provided a third switching circuit 518a that is arranged to connect said analog signal 522 from the data transmission cable 506c to the data transmission cable 506a. In connection with the network element 502a, there is provided a switching circuit 509b that is arranged to receive said analog signal 522 from the data transmission cable 506b of the modem line 503b. In connection with the network element 530, there is provided a switching circuit 518b that is arranged to connect said analog signal 522 from the data transmission cable 506c to the data transmission cable 506b. In connection with the network element 502, there is provided a regenerator 510a that is arranged to regenerate said synchronizing information from the analog signal 522. Respectively, in connection with the network element 502a there is provided a regenerator 510b that is arranged to regenerate said synchronizing information from the analog signal 522.

In an arrangement according to an embodiment of the invention, the switching circuit 518a is arranged to adjust the location of the frequency spectrum of said analog signal 522 in the frequency range. A need to adjust the location of the frequency spectrum of the analog signal 522 can arise for instance when the modem lines 503c and 503a have different data transmission bands. This kind of situation is at hand for example when the modem line 503c applies baseband modulation, and the modem line 503a applies band-pass modulation. The location of the frequency spectrum of the analog signal 522 can be adjusted for example by means of a mixer circuit or by means of a frequency multiplier or divider based on a phase-locked loop.

The arrangements illustrated in FIGS. 4 and 5 include:
- a modulator (407, 507) that is arranged to generate an analog signal (422, 522) modulated by synchronizing information, the frequency spectrum of said signal being located in a frequency range that falls outside the data transmission bands of the modem line (403a, 503c) connected to the first network element (401, 501) of the data transmission system,
- a first switching circuit (408a, 508) that is arranged to connect said analog signal (422, 522) to a first data transmission cable (406a, 506c) that forms part of the modem line (403a, 503c) connected to said first network element (401, 501),
- a regenerator (410a, 510a) that is arranged to regenerate said synchronizing information from said analog signal, and
- a second switching circuit (409a, 509a) that is arranged to connect said analog signal to said regenerator at a data transmission cable that forms part of the modem line (403a, 503a) connected to the second network element (402a, 502) of said data transmission system.

In the arrangement illustrated in FIG. 4, said data transmission cable that forms part of the modem line (403a) connected to said second network element (402a) is said first data transmission cable (406a).

Figure 6:
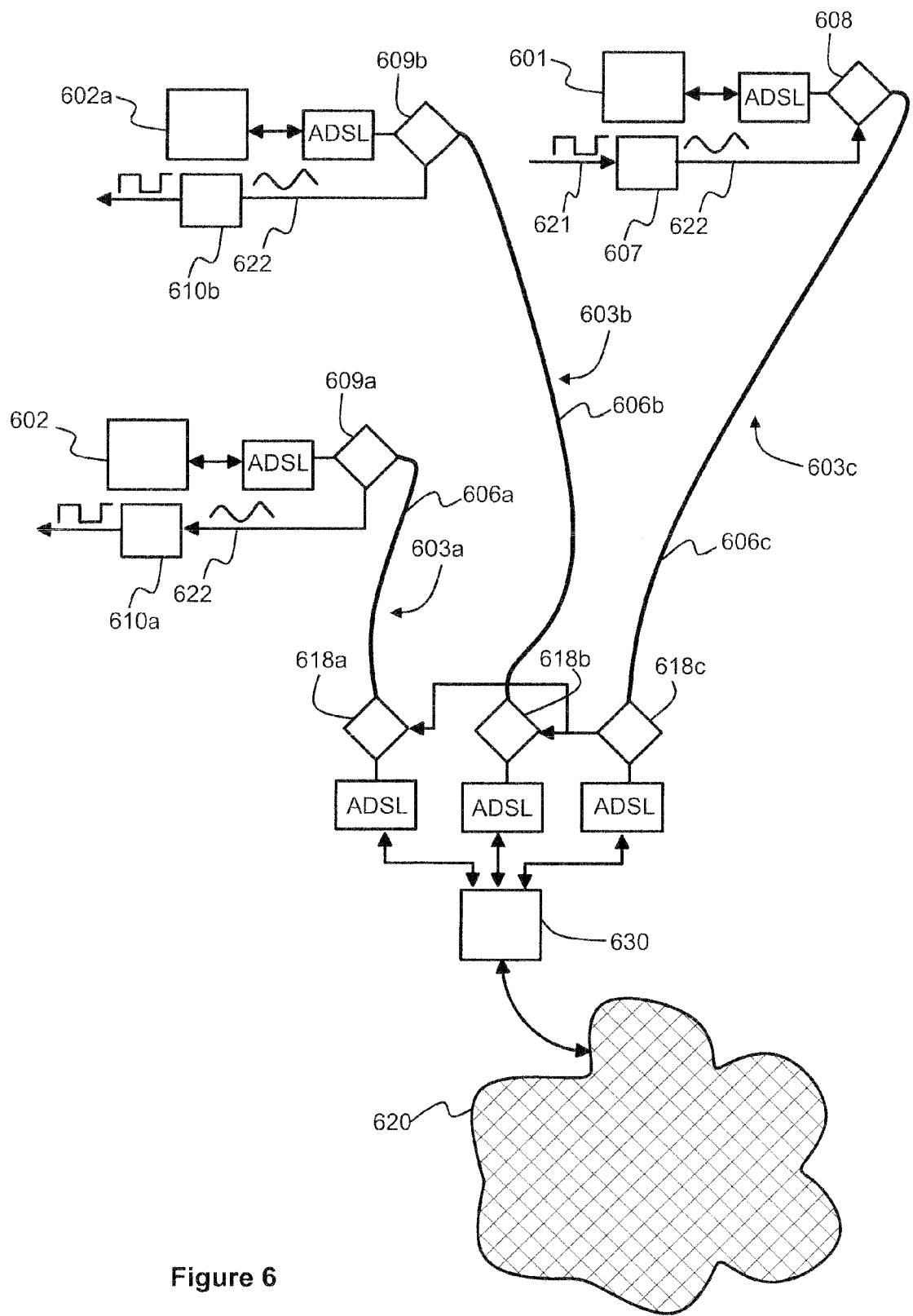
FIG. 6 illustrates an example of a data transmission system provided with an arrangement according to an embodiment of the invention for transferring synchronizing information.

In the arrangement illustrated in FIG. 5, said data transmission cable that forms part of the modem line connected to said second network element (502) is a second data transmission cable (506a), and the arrangement includes a third switching circuit (518a) that is arranged to connect said analog signal from said first data transmission cable to said second data transmission cable, FIG. 6 illustrates an example of a data transmission system provided with an arrangement according to an embodiment of the invention for transferring synchronizing information. The data transmission system includes network elements 601, 602, 630 and 602a. The data transmission system includes ADSL (Asymmetric Digital Subscriber Line) modem lines 603a, 603b and 603c, which constitute the data transmission connections between the network element 630 and each of the network elements 601, 602 and 602b. The ADSL modem lines 603a, 603b and 603c are provided with POTS splitters 608, 609a, 609b, 618a, 618b and 618c. The network element 630 is connected to a data network 620, which can be for example the Internet. Synchronizing information is transferred from the location of the network element 601 to the locations of the network elements 602 and 602a. In connection with the network element 601, there is provided a modulator 607 that is arranged to generate an analog signal 622 modulated by synchronizing information, the frequency spectrum of said signal being located in the telephone traffic audio frequency range (300 Hz-3400 Hz). The signal 621 connected to the input of the modulator 607 represents said synchronizing information. The low-pass branch of the POTS splitter 608 is arranged to connect said analog signal 622 to the data transmission cable 606c. The low-pass branch of the POTS splitter 618c is connected to the low-pass branches of the POTS splitters 618a and 618b for connecting said analog signal 622 from the data transmission cable 606c to the data transmission cables 606a and 606b. The low-pass branches of the POTS splitters 609a and 609b are arranged to receive said analog signal 622 from the data transmission cables 606a and 606b. In connection with the network element 602, there is provided a regenerator 610a that is arranged to regenerate said synchronizing information from said analog signal 622. Respectively, in connection with the network element 602a, there is provided a regenerator 610b that is arranged to regenerate said synchronizing information from said analog signal 622.

Figure 7:
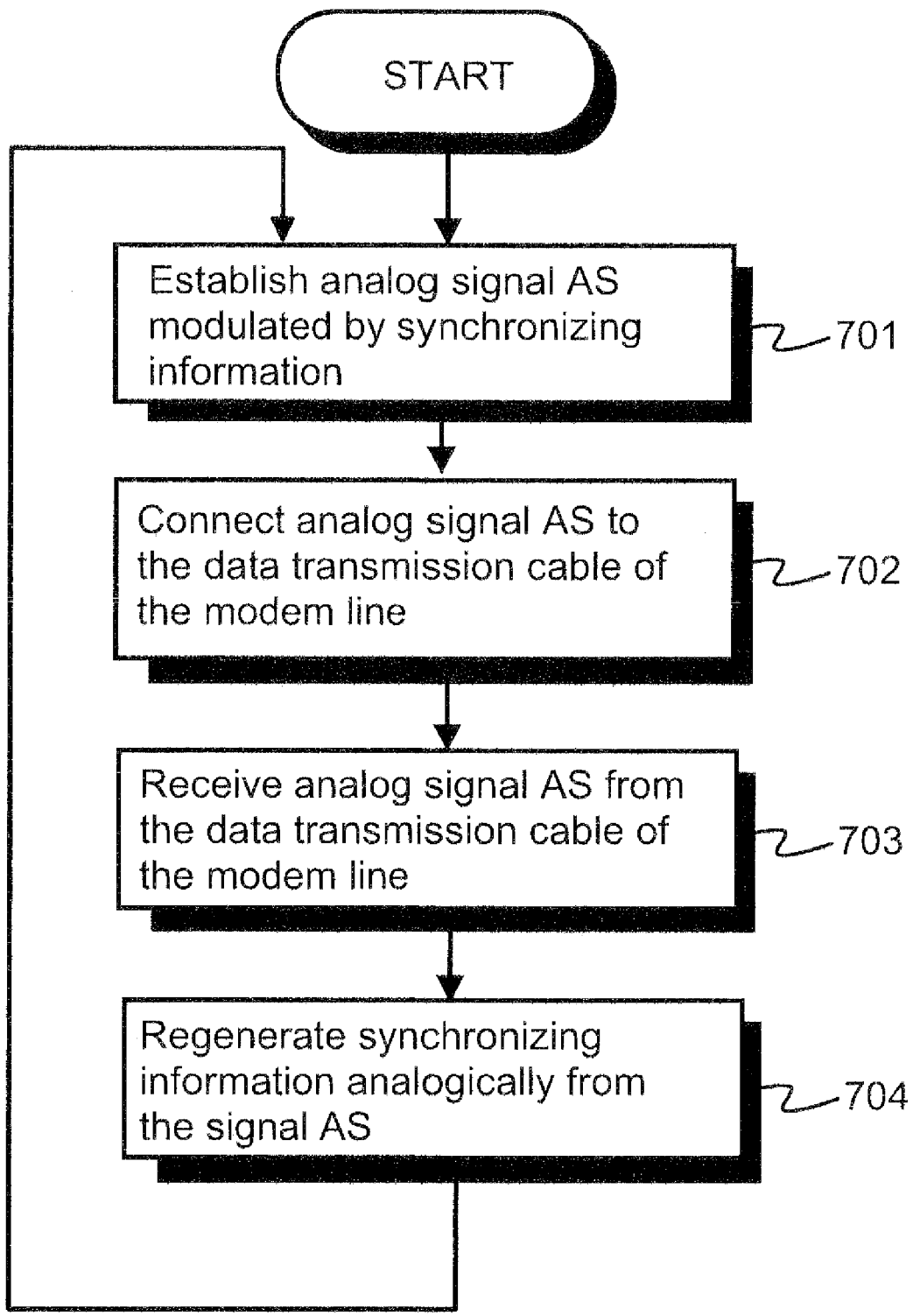
FIG. 7 is a flowchart illustrating a method according to an embodiment of the invention for transferring synchronizing information in a data transmission system including modem connections

FIG. 7 is a flowchart illustrating a method according to an embodiment of the invention for transferring synchronizing information in a data transmission system including modem connections. In step 701, there is established an analog signal AS modulated by said synchronizing information, the frequency spectrum of said signal being located outside the data transmission bands of the modem line connected to the first network element NE1 of said data transmission system. In step 702, said analog signal AS is connected to a first data transmission cable W1 that forms part of the modem line connected to the network element NE1. In step 703, said analog signal AS is received from the data transmission cable that forms part of the modem line connected to the second network element NE2 of said data transmission system and that is one of the following: the first data transmission cable W1 or the second data transmission cable W2. In step 704, said synchronizing information is regenerated from said analog signal AS.

In a method according to an embodiment of the invention, said data transmission cable that forms part of the modem line connected to said second network element NE2 is said first data transmission cable W1.

In a method according to an embodiment of the invention, said data transmission cable that forms part of the modem line connected to said second network element NE2 is said second data transmission cable W2, and said analog signal AS is connected at said first data transmission cable W1 to said second data transmission cable W2.

In a method according to an embodiment of the invention, the frequency spectrum of said analog signal AS is adjusted within the frequency range before connecting said analog signal AS to said second data transmission cable W2.

In a method according to an embodiment of the invention, said analog signal AS is a cyclic signal, the cycle whereof has a predetermined curve shape, and the cycle length whereof is determined on the basis of the cycle length of the clock signal representing said synchronizing information, Said predetermined curve shape can be for instance sinusoidal.

In a method according to an embodiment of the invention, the frequency spectrum of said analog signal AS is placed in a frequency range that is located below the data transmission bands of the modem line connected to said first network element NE1. Said modem line can be for example ADSL (Asymmetric Digital Subscriber Line) or VDSL (Very high speed Digital Subscriber Line).

In a method according to an embodiment of the invention, the frequency spectrum of said analog signal AS is placed in a frequency range that is located above the data transmission bands of the modem line connected to said first network element NE1. Said modem line can be for instance SDSL (Symmetric Digital Subscriber Line) or HDSL (High speed Digital Subscriber Line.

In a method according to an embodiment of the invention, the modem line connected to said first network element NE1 is ADSL (Asymmetric Digital Subscriber Line), the modem line connected to said second network element NE2 is ADSL, and the POTS splitters of said ADSL modem lines are used for connecting said analog signal AS to said first data transmission cable W1 and for receiving said analog signal AS from a data transmission cable that forms part of the modem line connected to said second network element NE2.

In a method according to an embodiment of the invention, said analog signal AS is received from a data transmission cable that forms part of the modem line connected to said second network element NE2 by using a filter, the stopband of which covers the frequency range of the data transmission bands of the modem line connected to said second network element NE2.

As is obvious for a man skilled in the art, the invention and its various embodiments are not restricted to the above described exemplary embodiments, but the invention and its embodiments can be modified within the scope of the independent claim. Such expressions included in the claims that describe provided characteristic features, for example "the arrangement includes a modulator", are open, so that the enlisting of characteristic features does not exclude the existence of other characteristic features that are not enlisted in the independent claims.

What is claimed is:

1. An arrangement for transferring synchronizing information in a data transmission system, the arrangement comprising:
   a modulator arranged to generate a first analog signal modulated by said synchronizing information, a frequency spectrum of said first analog signal being located in a frequency range that falls outside data transmission bands of a modem line, the modem line connected to a first network element of said data transmission system and to a second network element of said data transmission system, and said first analog signal being a separate signal with respect to second analog signals generated by modems of the modem line;
   a first switching circuit arranged to connect said first analog signal to a data transmission cable that is a part of the modem line;
   a regenerator arranged to regenerate said synchronizing information from said first analog signal; and
   a second switching circuit arranged to connect said first analog signal from the data transmission cable to said regenerator,
   wherein said second switching circuit is provided with a filter, the stopband whereof covers the frequency range of the data transmission bands of the modem line.

2. The arrangement according to claim 1, wherein said first analog signal is a cyclic signal, a cycle of which has a predetermined curve shape, and a cycle length of which is arranged to be determined on the basis of a cycle length of a clock signal representing said synchronizing information.

3. The arrangement according to claim 2, wherein said predetermined curve shape is essentially sinusoidal.

4. The arrangement according to claim 1, wherein said modulator is arranged to place the frequency spectrum of said first analog signal in a frequency range that is located below the data transmission bands of the modem line.

5. The arrangement according to claim 4, wherein the modem line is one of the following: ADSL (Asymmetric Digital Subscriber Line) or VDSL (Very high speed Digital Subscriber Line).

6. The arrangement according to claim 4, wherein the modem line is ADSL (Asymmetric Digital Subscriber Line) and said first and second switching circuits are POTS splitters of said ADSL modem line.

7. The arrangement according to claim 1, wherein said modulator is arranged to place the frequency spectrum of said first analog signal in a frequency range that is located above the data transmission bands of the modem line.

8. The arrangement according to claim 7, wherein the modem line element is one of the following: SDSL (Symmetric Digital Subscriber Line) or HDSL (High speed Digital Subscriber Line).

9. A method for transferring synchronizing information in a data transmission system, the method comprising:
   generating a first analog signal modulated by said synchronizing information, a frequency spectrum of said first analog signal being located outside data transmission bands of a modem line, the modem line connected to a first network element of said data transmission system and to a second network element of said data transmission system, and said first analog signal being a separate signal with respect to second analog signals generated by modems of the modem line;
   connecting said first analog signal to a data transmission cable that is a part of the modem line;
   receiving said first analog signal from the data transmission cable; and
   regenerating said synchronizing information from first said analog signal,
   wherein said first analog signal is received from the data transmission cable by using a filter, the stopband whereof covers the frequency range of the data transmission band of the modem line.

10. The method according to claim 9, wherein said first analog signal is a cyclic signal, a cycle of which has a predetermined curve shape, and a cycle length of which is determined on the basis of a cycle length of a clock signal representing said synchronizing information.

11. The method according to claim 10, wherein said predetermined curve shape is essentially sinusoidal.

12. The method according to claim 9, wherein the frequency spectrum of said first analog signal is placed in a frequency range that is located below the data transmission bands of the modem line.

13. The method according to claim 12, wherein the modem line element is one of the following: ADSL (Asymmetric Digital Subscriber Line) or VDSL (Very high speed Digital Subscriber Line).

14. The method according to claim 12, wherein the modem line element is ADSL (Asymmetric Digital Subscriber Line), and POTS splitters of said ADSL modem lines are used for connecting said first analog signal to the data transmission cable and for receiving said first analog signal from the data transmission cable.

15. The method according to claim 9, wherein the frequency spectrum of said first analog signal is placed in a frequency range that is located above the data transmission bands of the modem line.

16. The method according to claim 15, wherein the modem line is one of the following: SDSL (Symmetric Digital Subscriber Line) or HDSL (High speed Digital Subscriber Line).

17. An arrangement for transferring synchronizing information in a data transmission system, the arrangement comprising:
- a modulator arranged to generate a first analog signal modulated by said synchronizing information, a frequency spectrum of said first analog signal being located in a frequency range that falls outside data transmission bands of a first modem line connected to a first network element of said data transmission system and said first analog signal being a separate signal with respect to second analog signals generated by modems of the first modem line;
- a first switching circuit arranged to connect said first analog signal to a first data transmission cable that is a part of the first modem line;
- a second switching circuit that is arranged to connect said first analog signal from said first data transmission cable to a second data transmission cable that is a part of a second modem line connected to a second network element of said data transmission system;
- a regenerator arranged to regenerate said synchronizing information from said first analog signal; and
- a third switching circuit arranged to connect said first analog signal to said regenerator from the second data transmission cable,
- wherein said third switching circuit is provided with a filter, the stopband whereof covers the frequency range of the data transmission bands of the second modem line.

18. The arrangement according to claim 17, wherein said second switching circuit is arranged to adjust the location of the frequency spectrum of said first analog signal in the frequency domain.

19. The arrangement according to claim 17, wherein said first and second modem lines are ADSL modem lines (Asymmetric Digital Subscriber Line), and said first and third switching circuits are POTS splitters of said first and second ADSL modem lines.

20. A method for transferring synchronizing information in a data transmission system, the method comprising:
- generating a first analog signal modulated by said synchronizing information, a frequency spectrum of said first analog signal being located outside data transmission bands of a first modem line connected to a first network element of said data transmission system and said first analog signal being a separate signal with respect to second analog signals generated by modems of the first modem line;
- connecting said first analog signal to a first data transmission cable that is a part of the first modem line;
- connecting said first analog signal from the first data transmission cable to a second data transmission cable that is a part of a second modem line connected to a second network element of said data transmission system;
- receiving said first analog signal from the second data transmission cable; and
- regenerating said synchronizing information from said first analog signal,
- wherein said first analog signal is received from the second data transmission cable by using a filter, the stopband whereof covers the frequency range of the data transmission band of the second modem line.

21. A method according to claim 20, wherein the frequency spectrum of said first analog signal is adjusted in the frequency domain prior to connecting said first analog signal to said second data transmission cable.

22. The method according to claim 20, wherein said first and second modem lines are ADSL modem lines (Asymmetric Digital Subscriber Line), and POTS splitters of said first and second ADSL modem lines are used for connecting said first analog signal to said first data transmission cable and for receiving said first analog signal from the second data transmission cable.

* * * * *